United States Patent [19]

Kitani

[11] Patent Number: 4,934,808
[45] Date of Patent: Jun. 19, 1990

[54] PROGRESSIVE POWER OMNIFOCAL LENS

[75] Inventor: Akira Kitani, Fussa, Japan

[73] Assignee: Hoya Corporation, Tokyo, Japan

[21] Appl. No.: 226,410

[22] Filed: Jul. 29, 1988

[30] Foreign Application Priority Data

Jul. 31, 1987 [JP] Japan .................................. 62-192530

[51] Int. Cl.$^5$ ................................................ G02C 7/06
[52] U.S. Cl. ..................................................... 351/169
[58] Field of Search .................... 351/168–172

[56] References Cited

U.S. PATENT DOCUMENTS 4,729,651  3/1988  Kitani ................................. 351/169

FOREIGN PATENT DOCUMENTS 2130391  5/1984  United Kingdom ................ 351/169

*Primary Examiner*—Scott J. Sugarman
*Attorney, Agent, or Firm*—Darby & Darby

[57] ABSTRACT

A progressive power omnifocal lens (1, 5) for constituting spectacles having for vision and near vision focuses, having an area in which the refacting power progressively changes (successively increases) from upper to lower positions in the vicinity of the horizontal center of the lens; and a main fixation line (4, 6) generally called an "umbilical meridian" formed in the progressive-change area, in which the degree of astigmatism along the main fixation line is substantially zero, and the main fixation line is gradually displaced toward the nose in accordance with the convergence of the eyes as it extends from an upper position to a lower position. The disposition of the main fixation line displaced toward the nose is varied depending upon the addition of the lens in such a manner that it is shifted upward as the addition of the lens is reduced, thereby optimizing the performance of the lens for a particular user.

2 Claims, 2 Drawing Sheets

PROGRESSIVE POWER OMNIFOCAL LENS

BACKGROUND OF THE INVENTION

This invention relates to a spectacle lens and, more particularly, to an improvement in a progressive power omnifocal lens having a zone along which the refracting power progressively changes vertically in the vicinity of the horizontal center of the lens.

A progressive power omnifocal lens is used for presbyopia, having a refracting power that gradually changes along a line on the lens (main fixation line or a principal sight line) along which the sight line passes when it shifts from far vision to near vision. The main fixation line on a progressive power omnifocal lens should be located at a position where the sight line most frequently passes. Preferably, there is no astigmatism along the main fixation line.

A point on the surface of the lens where the astigmatism is zero can be regarded as an infinitesimal spherical surface and is generally called an "umbilical point". A row of successive "umbilical points" is called an "umbilical meridian", and this umbilical meridian is usually employed as the main fixation line. The degree of astigmatism is zero on the umbilical meridian of a progressive power omnifocal lens, but it increases at an ascending rate as it deviates from this line. There are therefore extremely inferior optical conditions.

In other words, in the region of a progressive power omnifocal lens where the refracting power gradually changes, only that region which is in the vicinity of the umbilical meridian, has good optical performance (region of distinct vision). The other regions are usually treated as regions of non-distinct vision due to the existence of astigmatism.

Consequently, the disposition of the umbilical meridian (main fixation line) on a spectacle lens is very important. This line should be located at a position where the sight line most frequently passes on the basis of elaborate studies as to how the sight line of the user wearing the spectacles moves.

Examples of conventional techniques relating to the disposition of the main fixation line are disclosed in Japanese Patent Examined Publication No. 47-9626, and Japanese Patent Unexamined Publication Nos. 57-10113, 57-210320, and 59-88718. Japanese Patent Examined Publication No. 47-9626 and Japanese Patent Unexamined Publication Nos. No. 57-10113, and 57-210320 disclose techniques relating to asymmetry of the refracting surface of the lens due to the disposition of the main fixation line based on convergence of the eyes (inward movement of the sight lines of the left and right eyes when shifting from far vision to near vision). In particular, Japanese Patent Unexamined Publication No. 59-88718 discloses a technique relating to the relationship between the inward displacement of the main fixation line in response to convergence of the eyes and the changes that take place in the refracting power along the main fixation line.

These techniques, however, are not concerned with determination of the disposition of the main fixation line with respect to the addition of the lens. A person suited to wearing a progressive power omnifocal lenses of comparatively low addition is an incipient presbyopia person who is unskillful to focus the eye and whose experience in wearing far vision spectacles is inadequate. Generally, such a person is unskilled in the basic manner of using progressive power omnifocal lenses by, for near vision eye work, projecting the chin slightly forward and directing the sight lines downward so as to see through the lower portions of the spectacle lenses (for near vision eye work). He tends to look a close objects through slightly above the near vision portions of the lenses (these portions designed for intermediate-distance eye work). Complaints that "it is difficult to see a close objects" or "near-vision is restricted" are often made as a result of this tendency.

This is because looking through the portions above the proper portions set in the spectacle lenses for near vision focusing means looking with the sight lines from the left and right eyes passing through portions that inwardly deviate from the main fixation lines. As described above, this is near vision focusing with a high degree of astigmatism. Furthermore, the directions of astigmatism with respect to the left and right eyes (the directions in which the image is warped) differ from each other to such a degree that they meet almost at right angles, thereby making image fusion highly difficult.

In a possible design method aimed at avoiding this defect, the portion for near vision focusing is shifted higher in the case of a low addition lens. However, this method is the same as a method aiming at reducing the length of the zone of progressive change, resulting in another problem of producing abrupt increase in the degree of astigmatism in the lateral area.

In view of these problems, it is an object of the present invention to provide an easy-to-use progressive power omnifocal lens in which the main fixation line is disposed in accordance with the characteristic tendency with which a particular person wearing the spectacles shifts the sight line from each of his or her eyes.

To this end, the present invention provides a progressive power omnifocal lens having an area in which the refracting power progressively changes (successively increases) from upper to lower positions in the vicinity of horizontal center of the lens; and a main fixation line generally called an "umbilical meridian" formed in this progressive-change area, in which the degree of astigmatism along the main fixation line is substantially zero, and the main fixation line is gradually displaced toward the nose in accordance with the convergence of the eyes as it extends from an upper position to a lower position, the displacement of the main fixation line toward the nose being varied depending upon the addition of the lens.

The present invention also provides a progressive power omnifocal lens in which the position from which the displacement of the main fixation line toward the nose is started is shifted upward if the addition of the lens is reduced.

The addition of the progressive power omnifocal lens corresponds to the degree to which the person who will wear the progressive power omnifocal lens lacks the ability to focus the eyes.

Therefore, a progressive power omnifocal lens of comparatively low addition is used for a presbyopia person at a comparatively early stage of experiencing long-sightedness while a progressive power omnifocal lens of comparatively high strength is used for a presbyopia person at a comparatively late stage of experiencing long-sightedness.

There is a great difference between presbyopia persons at the early and late stages in terms of the manner in which the sight lines shift from far vision to near vision.

Specially, a presbyopia person at an early stage of development of this condition tends to move (downward) the sight lines to a smaller extent during the course of changing from far vision to near vision compared with a person who is experiencing a late state of long-sightedness.

In consequence, the main fixation line (indicated at 4 in FIG. 1) on a progressive power omnifocal lens of comparatively low addition (lens 1 in FIG. 1) is formed in such a manner that it extends downward from a position higher than that of the main fixation line (indicated at 6 in FIG. 2) on a progressive power omnifocal lens of a comparatively high addition (lens 5 in FIG. 2) while being displaced inward (toward the nose). The main fixation line is thus made to coincide with the movement of the sight line of a each individual presbyopia person.

DESCRIPTION OF THE PREFERRED EMBODIMENT

An embodiment of the present invention will be described below with reference to the accompanying drawings.

Figure 1:
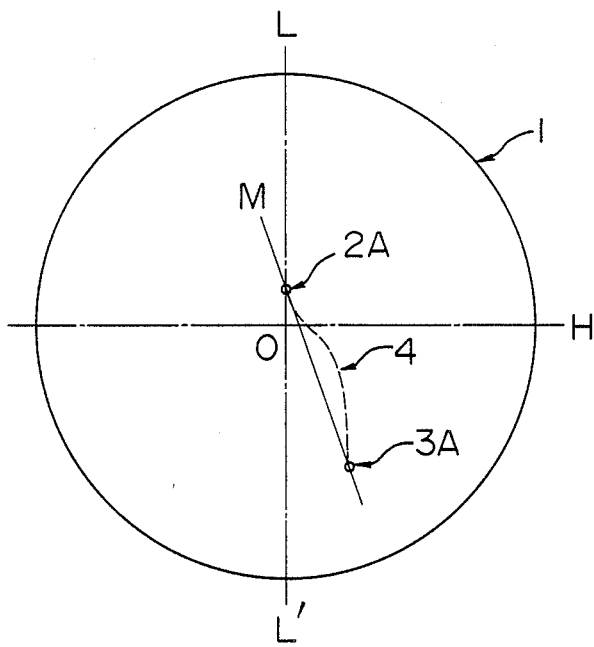
FIG. 1 is a diagram of the disposition of a main fixation line on a progressive power omnifocal lens in accordance with the present invention.

FIG. 1 shows a disposition of a main fixation line on a progressive power omnifocal lens 1 for the right eye viewed from the side of the convex surface thereof.

The lens 1 has a geometrical center O through which a meridian L=L' passes, a far vision region center 2A having a diopter of 0.00, and a far vision region center 3A having a diopter of +0.50. The addition of the lens is therefore 0.50. A reference character H in FIG. 1 indicates the horizontal direction.

The disposition of the main fixation line on the lens 1 is indicated by the reference character 4. The near vision region center 3A is downwardly spaced apart from the far vision region center 2A by 16 mm while being displaced toward the nose by 2.5 mm.

The main fixation line 4 is formed of an umbilical meridian, and the degree of astigmatism thereon is substantially zero. It is based on the same design as the progressive power omnifocal lens proposed by the applicant of the present invention in Japanese Patent Unexamined Publication No. 57-230320; the umbilical meridian is displaced toward the nose; and the distribution of astigmatism is asymmetrical about the umbilical meridian in the horizontal direction on the nasal side and the temporal side.

Figure 4:
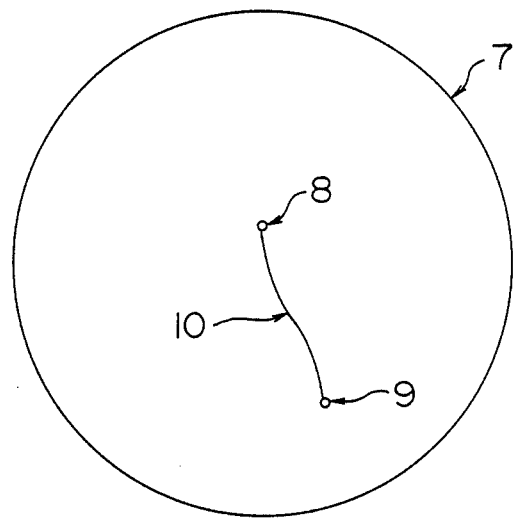
FIG. 4 is a diagram of the disposition of a main fixation line on a conventional progressive power omnifocal lens.

In comparison with the progressive power omnifocal lens 7 of the conventional art shown in FIG. 4, the position at which the displacement of the main fixation line on the lens 1 shown in FIG. 1 is started as this line extends downward is higher although the zones of progressive change of these lenses are equal in length. The main fixation line 4 is positioned above a straight line M which connects the far vision region center 2A and the short-distance-focusing center 3A.

Since, as described above, an incipient presbyopia person tends to shift the sight lines downward to a smaller extent during change from far vision to near vision, it is easy for such a person to use progressive power omnifocal lenses formed in the same manner as the lens 1 shown in FIG. 1 in which the displacement of the main fixation line is started at a correspondingly higher position.

Also, the length of the progressive-change zone of this lens is substantially the same as that of an ordinary progressive power omnifocal lens (e.g., a conventional lens shown in FIG. 4). Therefore, this lens can be designed to avoid steep concentrations of aberration in side portions.

Figure 2:
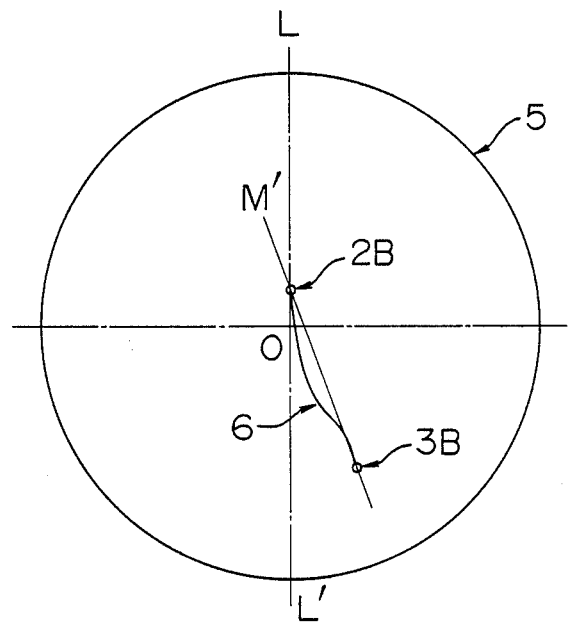
FIG. 2 is a diagram of the disposition of a main fixation line on another progressive power omnifocal lens in accordance with the present invention.

FIG. 2 shows a progressive power omnifocal lens 5 based on the same design as that of the lens shown in FIG. 1 except for the disposition of the main fixation line. The position of a far vision region focusing center 2B and the position of a near vision region center 3B of the lens 5 are the same as the lens shown in FIG. 1.

The far vision region center 2B is of a diopter of 0.00; the near vision region center 3B is of a diopter of +3.00; and the addition of the lens is 3.00.

The near vision region center 3B is downwardly spaced apart from the far vision region center 2B by 16 mm while being displaced toward the nose by 2.5 mm.

A main fixation line 6 is positioned below a straight line M' which connects the near vision region center 2B and the near vision region center 3B.

Therefore, this lens is used for a presbyopia person at a comparatively late stage of experience of the long-sightedness who is skilled in basic use of the progressive power omnifocal lens. However, this lens is also easy to use because the extent of downward movement of the sight line is large.

Figure 3:
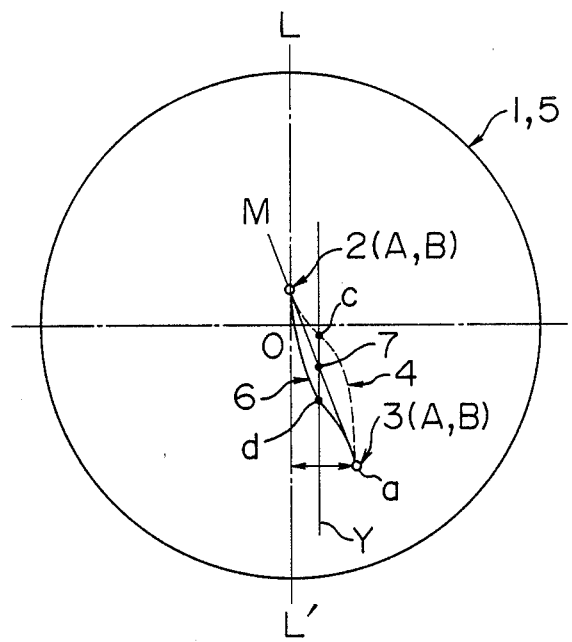
FIG. 3 is a diagram of the composition of the main fixation lines shown in FIGS. 1 and 2.

FIG. 3 shows a comparison between the dispositions of the main fixation lines shown in FIGS. 1 and 2. It is understood that the manner in which the main fixation line is displaced toward the nose greatly differs between the additions which are 0.5 and 3.00.

The main fixation line corresponding to the convergence of the eyes as described in the specification of the present invention includes not only a type of line which is curved as viewed from the side of the concave surface, such as those shown in FIGS. 1 and 2, for example, those disclosed in Japanese Patent Unexamined Publication Nos. 59-88718 and 57-210320 but also another type of line having straight and bent portions.

The disposition of the main fixation line is varied with respect to the addition of the lens not only every unit value thereof but also every range of the addition divided into more than two. In other words, the present invention is effective whatever the pitch of addition or range of approximating additions with which the disposition of the main fixation line is changed.

It may be said that the main fixation line is disposed at an upper or lower position relative to the position of a point of intersection (point c in the case of the lens 1 or point d in the case of the lens 5) of the main fixation line and a bisector Y of a line indicating a distance (a) between the far vision region center 2 and the near vision region center 3, as shown in FIG. 3.

Preferably, the positions of these points of intersection (c and d) are above a point of intersection 7 of the bisector Y and the straight line M which connects between the far vision region center 2 and the near vision region center 3 if the lens is of a weak type and the addition thereof is smaller than 1.50; these positions are below the point of intersection 7 if the lens is of a strong type and the addition thereof is greater than 2.50; and these positions are in the vicinity of the point of intersection 7 if the lens is of a medium type and the addition thereof is 1.75 to 2.25.

The lens in accordance with the present invention is easy to use for both a person whose experience in wearing far vision spectacles is inadequate and a person who is skilled in using far vision spectacles because the lens is designed to change the disposition of the main fixation line depending upon the addition of the lens.

The length of the progressive-change zone is substantially constant although manner of displacing the main fixation line is changed depending upon the addition of the lens. Therefore, there is no possibility of increase in the degree of lateral astigmatism.

What is claimed is:

1. A progressive power omnifocal lens having a horizontal center, a far vision region with a far vision center and a near vision region below said far vision region and with a near vision region center, a nasal side and a temporal side and also having a progressive change area in which the refracting power progressively changes by successively increasing from an upper position to a lower position in the vicinity of the horizontal center of said lens, and a main fixation line generally called as an umbilical meridian formed in said progressive-change area wherein the degree of astigmatism along said main fixation line is substantially zero, and said main fixation line is gradually displaced toward the nasal side in accordance with the convergence of the eyes of a user as it extends from an upper position to a lower position, wherein the disposition of said main fixation line displaced toward the nasal side is varied depending upon the addition of the lens so that if said addition is less than 1.50, said main fixation line lies above a straight line connecting between said far vision region center and said near vision region center, while if said addition is larger than 2.50, said main fixation line lies below said straight line.

2. A progressive power omnifocal lens according to claim 1, wherein the disposition of said main fixation line displaced toward the nose is shifted upward as the addition of said line is reduced.

* * * * *